US006757096B2

United States Patent
Schiller

(10) Patent No.: US 6,757,096 B2
(45) Date of Patent: Jun. 29, 2004

(54) SHORT PULSE OPTICAL PARAMETRIC OSCILLATOR SYSTEM

(76) Inventor: Stephan Schiller, Sinterstrasse 16, D-42781 Haan (DE)

( * ) Notice: Subject to any disclaimer, the term of this patent is extended or adjusted under 35 U.S.C. 154(b) by 255 days.

(21) Appl. No.: 09/983,437

(22) Filed: Oct. 24, 2001

(65) Prior Publication Data

US 2002/0048078 A1 Apr. 25, 2002

(30) Foreign Application Priority Data

Oct. 25, 2000 (DE) .......................................... 100 52 974

(51) Int. Cl.[7] ................................................. G02F 1/39
(52) U.S. Cl. ......................................... 359/330; 372/22
(58) Field of Search ................................ 359/326–332; 372/20–22

(56) References Cited

U.S. PATENT DOCUMENTS 3,628,186 A * 12/1971 Ashkin et al. .......... 331/107 R
5,828,484 A * 10/1998 Ho et al. .................... 359/258
5,999,547 A * 12/1999 Schneider et al. ............ 372/21

FOREIGN PATENT DOCUMENTS

DE 101 52 507 A1 * 10/2002 ............. G02F/1/39

* cited by examiner

*Primary Examiner*—John D. Lee
(74) *Attorney, Agent, or Firm*—Paul Vincent

(57) ABSTRACT

Conventional short pulse optical parametric oscillator systems have relatively low repetition rates and cannot be pumped by continuous-wave lasers. The invention describes passively mode locked parametric oscillators, consisting of a continuous-wave laser pump source, an optical resonator which is resonant for only one of the two parametrically generated waves, a non-linear medium, and a saturable absorber or a medium for formation of a Kerr lens and an aperture. The repetition rate of such an oscillator system can be selected within a large range through selection of the resonator length. Fields of use are measuring technology and optical spectroscopy.

19 Claims, 2 Drawing Sheets

SHORT PULSE OPTICAL PARAMETRIC OSCILLATOR SYSTEM

This application claims Paris Convention priority of DE 100 52 974.7 filed Oct. 25, 2000, the complete disclosure of which is hereby incorporated by reference.

BACKGROUND OF THE INVENTION

Short pulse optical parametric oscillators (OPO) are used as sources of short laser pulses whose wavelength can be tuned, e.g. for applications in optical measuring technology and time-resolved linear and non-linear spectroscopy. Trains of short pulses trains are obtained through synchronous pumping of the oscillator with a likewise mode-locked pump laser (see e.g. P. Loza-Alvarez et al., Journal of the Optical Society of America B, Volume 16, No. 9, pages 1553–1560 (1999)). This conventional procedure has a plurality of disadvantages. In practice, the repetition rate of the oscillator is usually equal to the repetition rate of the pump laser. Although sub-harmonics of the repetition rate are also possible, reduction of the amplification of the pulses and hence a higher threshold and lower output power of the oscillator are associated therewith. Oscillators are required having repetition rates in the range of e.g. 1 GHz. However, conventional mode-locked pump lasers have repetition rates of 80 MHz. This does not permit efficient matching. In addition, continuous-wave pump lasers cannot be used for pumping conventional short pulse OPOs although they are often available. Purchase of an expensive mode-locked laser is therefore necessary.

For actively mode-locked OPOs, high repetition rates are also difficult to achieve. Moreover, devices for active mode locking disadvantageously require special electronics (see e.g. S. A. Diddams et al., Optics Letters, Volume 24, No. 23, pages 1747–1749 (1999)).

SUMMARY OF THE INVENTION

The invention, as articulated in the independent claims, eliminates these disadvantages. In accordance with the invention, passively mode-locked optical parametric oscillators are implemented through use of a passive mode-locking (mode-coupling) method in the resonator and of a suitable continuous-wave laser. The mode-locking method can be a saturable absorber or a Kerr lens having low losses in the saturated state and with low power of the resonated wave, respectively. The oscillation threshold can be reached using a non-linear medium of high non-linearity and a powerful continuous-wave pump source.

The repetition rate of the mode-coupled pulse train is determined by the optical path length of the oscillator resonator and can be selected throughout a large range, in particular up to the GHz region. Advantageously, the repetition rate can be adjusted to different user applications through modification of the resonator by the user.

Users of short pulse lasers often use continuous-wave lasers, since they are required for pumping other continuous-wave lasers (e.g. a neodymium:Yttrium vanadate laser for pumping a continuous-wave titanium sapphire laser). The emission power and beam direction of continuous-wave lasers, in particular diode pumped continuous-wave lasers, are highly stable over time. These properties are advantageous since they have a positive effect on the corresponding properties of the radiation emitted by the oscillator and facilitate use. Diode-pumped continuous-wave lasers have high electrical efficiency, require little maintenance and are compact. These properties provide additional reasons for advantageous use in pumping short pulse optical parametric oscillators.

To avoid the consequences of the different phase speeds in the resonator at the wavelengths of the two parametrically generated waves (signal and idler wave), the resonator of the invention is a singly-resonant OPO. For high power applications, the reflectivity of the resonator for that wave (signal or idler wave) which is required for the application, is suitably chosen to be small. The peak output power and the average output power are considerably higher for the non-resonant wave than for the resonant wave.

In a preferred embodiment, the resonator is provided with a device which initiates the pulse formation in the resonator. External initiation of the pulse formation may be advantageous in certain cases to reliably start the pulse train.

In a particularly advantageous embodiment, the compensating system comprises dispersion-compensating dielectric mirrors with particular dispersion properties which partially or largely compensate for the group velocity dispersion of other elements in the resonator. This system advantageously exhibits simplicity and compactness compared to e.g. prisms.

To generate very short pulses, the non-linear medium in the resonator must have a correspondingly large amplification bandwidth. For media with homogeneous non-linear coefficients, this width is determined, among others, by the dispersion of the refractive index. It can be increased by implementation of a suitable inhomogeneity of the non-linear coefficient. This can, in particular, be realized through use of a non-linear crystal whose non-linearity is spatially modified through a poling process. A suitable series of regions in the non-linear medium having high and low non-linearity, optimizes the shape and width of the spectral phase adjustment curve with respect to the pulse duration requirements.

In certain cases, the power of the pump laser is not sufficient to exceed the oscillation threshold of the OPO or to provide sufficient output power of the OPO, e.g. due to high losses in the OPO resonator or in consequence of low non-linearity of the non-linear medium. In these cases, the pumping power can be increased by resonant enhancement. Towards this end, the resonator is provided with mirrors of sufficiently large reflectivity at the wavelength of the pump laser. When using a single-frequency pump laser (of angular frequency $\omega_P$), either the length of the OPO resonator is continuously controlled by a control system such that one of its longitudinal mode frequencies is always in resonance with the frequency of the pump laser or the frequency of the pump laser is continuously controlled such that it is resonant with a mode frequency. In either case, a pumping power increase is produced and values greater than 10 can be obtained.

In an advantageous embodiment of the invention, a pump laser is used which emits at several longitudinal modes of the laser resonator. The optical length of the OPO resonator is thereby dimensioned to equal the optical length of the laser resonator or is a multiple thereof. A pumping power increase can thereby be obtained via a device which controls the length of the OPO resonator to a sufficiently precise degree that simultaneous resonance between a major portion of the longitudinal modes of the pump laser and corresponding longitudinal modes of the OPO resonator can be continuously maintained. In this configuration, the repetition rate of the OPO equals the frequency separation of the pump laser modes or a simple fraction thereof (½, ⅓, etc.).

In a further embodiment of the invention the saturable absorber is a saturable Bragg reflector. Saturable Bragg reflectors are particularly simple and advantageous saturable absorbers. They are mirrors made from artificially structured semiconductors. Their reflectivity in the saturated state is very high, up to approximately 99%. This keeps the loss in the OPO resonator small, as is required for a low pump threshold.

In a further embodiment of the invention, the non-linear medium is a periodically poled crystal with non-linear susceptibility of second order. Periodically poled crystals have a higher non-linearity than crystals which are phase-adjusted through double refraction, since with suitable period, larger coefficients of the non-linear tensor can be utilized. A high non-linearity advantageously reduces the pump threshold.

In addition to non-linear media of second order, non-linear media of third order can also be used to produce parametric amplification. These have the advantage that a considerably larger number of such materials is available. In this case, the mean frequencies of the signal and idler pulses $\omega_1$, $\omega_2$ are constrained by $2\omega_P=\omega_1+\omega_2$. An obvious extension would be the use of two continuous-wave pump sources of different frequencies $\omega_{P1}$ and $\omega_{P2}$ instead of one single frequency. This is advantageous in that one additional free parameter, the difference $\omega_{P1}-\omega_{P2}$ is provided to meet the phase adjustment condition. In this case $\omega_{P1}+\omega_{P2}=\omega_1+\omega_2$ for the waves concerned.

In accordance with a particularly advantageous embodiment, the non-linear medium is an optical fiber. Optical fibers produce a large interaction length and a small mode cross-section and therefore strong parametric interaction. Additionally, the group speed dispersion properties can be strongly influenced through special fiber geometries, e.g. with photonic crystal fibers. In addition, they are relatively inexpensive to produce.

Further advantages of the invention can be extracted from the description and the drawing. The features mentioned above and below can be used in accordance with the invention either individually or collectively in any arbitrary combination. The embodiments shown and described are not to be understood as exhaustive enumeration but rather have exemplary character for describing the invention.

The invention is shown in the drawing and explained in more detail by means of embodiments.

DESCRIPTION OF THE PREFERRED EMBODIMENT

Figure 1:
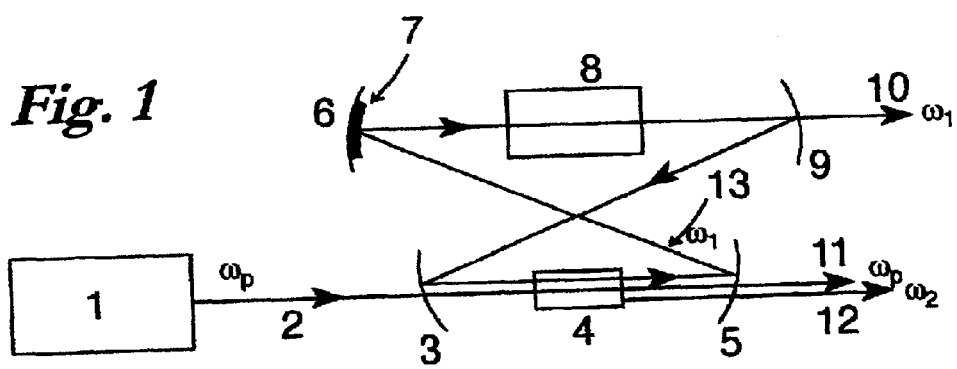
FIG. 1 shows a schematic illustration of the invention.

As illustrated in FIG. 1, the optical resonator is provided with a device for reducing the group velocity dispersion of the pulses resonating in the resonator. A pump laser 1 emits a continuous wave of frequency $\omega_P$ 2 which passes through a mirror 3 which is permeable therefor, and is focussed in the non-linear medium 4. Non-converted pump radiation exits the resonator in the form of a wave 11. The mirrors 3, 5, 6 and 9 form the optical resonator of the oscillator system. The mirrors are partially curved to create a resonator with stable spatial modes. The mirror 5 has high transmissivity for the parametrically generated wave of average frequency $\omega_2$ such that the resonator is resonant only for the wave 13 of average frequency $\omega_1$. The output wave 12 is available for use. The resonator mirror 6 is provided with a saturable absorber 7 which permits passive mode locking. The exit mirror 9 is partially permeable for the wave 13 and provides the output wave 10 to the user. The group velocity dispersions of the resonator elements for the parametrically generated pulses of the wave 13 cause a lower limit to pulse duration. These are reduced or largely suppressed by the compensating system 8.

Using the susceptibility of second order of the non-linear medium, the respective wave frequencies are related by $\omega_P=\omega_1+\omega_2$.

Figure 2:
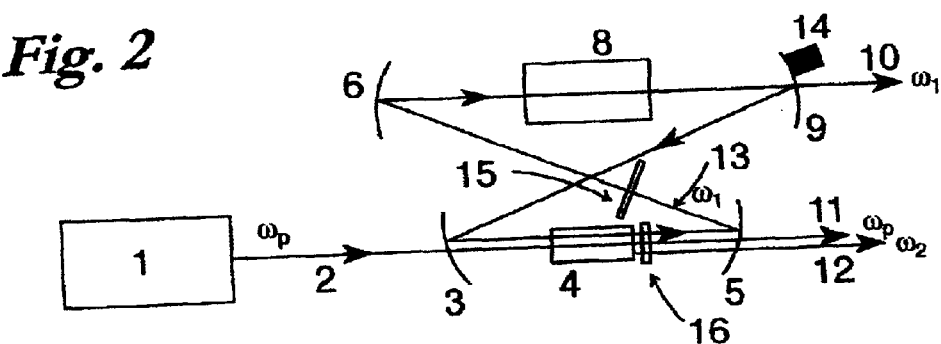
FIG. 2 shows an embodiment of the invention having a Kerr lens.

In the embodiment of the invention shown in FIG. 2, a device 14 is provided for initiating pulse formation. In addition, means are incorporated for generating a Kerr lens 16 in the non-linear medium 4 through cooperation with an aperture 15.

Figure 3:
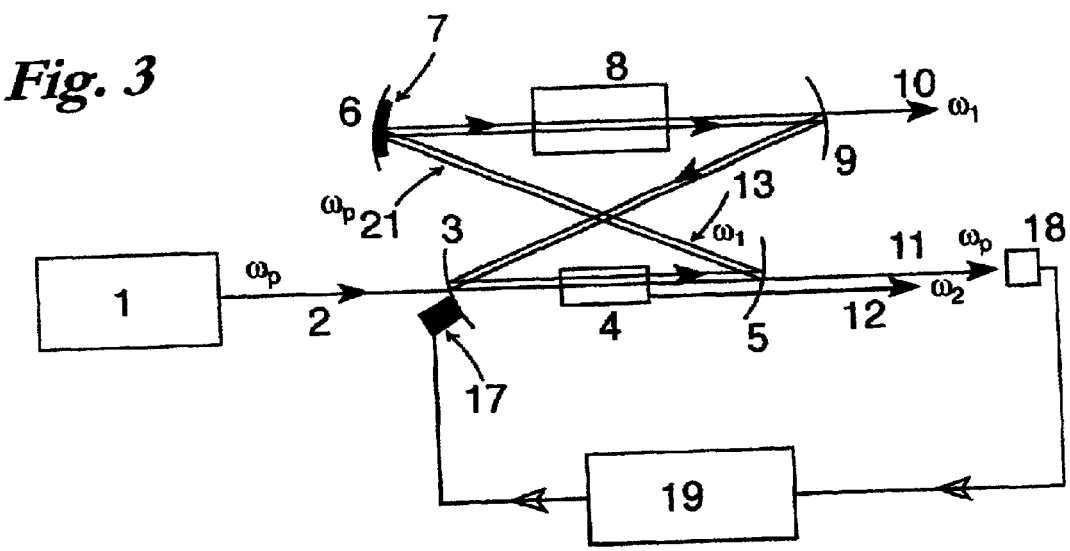
FIG. 3 shows an embodiment of the invention comprising means for resonating the pump wave and maximizing the pumping power of the pump laser through adjustment of the optical path length of the resonator.

In the embodiment of the invention shown in FIG. 3, a device 17 is provided for changing the optical path length of the resonator. The change is effected in response to measurement of the pump wave power enhancement using a device 18. The device 18 for measuring the pump wave power increase communicates with regulation means 19 which controls the path length adjustment device 17 to maximize pump wave power.

Figure 4:
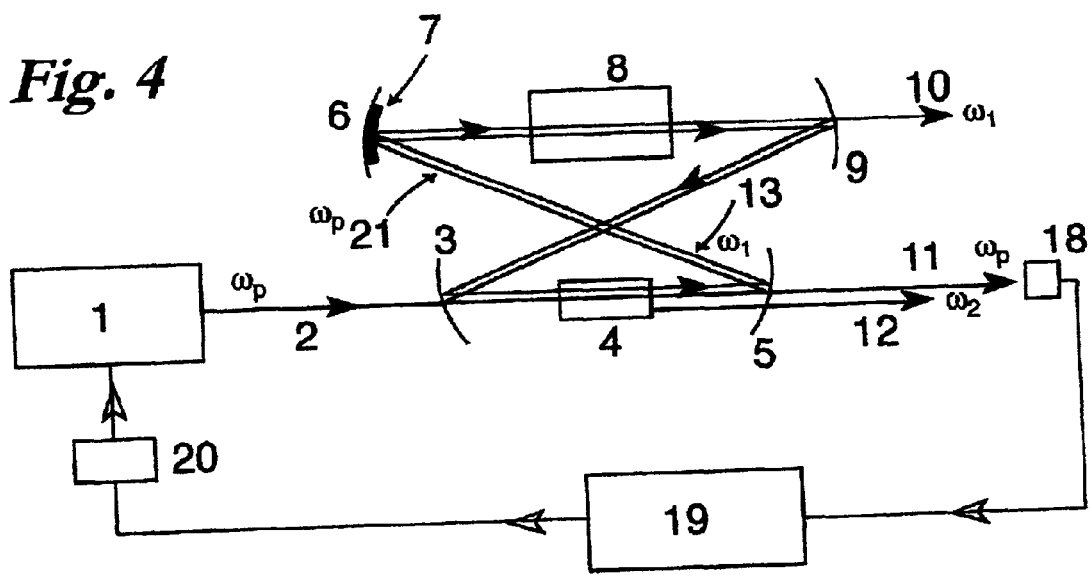
FIG. 4 shows an embodiment of the invention comprising means for resonating the pump wave and maximizing the pumping power of the pump laser through adjustment of the pump laser frequency.

In the embodiment of the invention shown in FIG. 4, the resonated pump wave power is maximized through control of the pump laser frequency via a device 20 for tuning the pump laser frequency $\omega_P$. The tuning device 20 is controlled by regulation means 19 in response to detection of changes in the resonated pump wave power by device 18 to maximize pump wave power enhancement as a function of pump laser frequency.

List of Reference Numerals

| | |
|---|---|
| 1: | pump laser |
| 2: | pump wave |
| 3: | resonator mirror, transmitting for the pump wave |
| 4: | non-linear medium |
| 5: | resonator mirror, transmitting for the pump source and the parametrically generated wave of the average frequency $\omega_2$ |
| 6: | resonator mirror |
| 7: | saturable absorber |
| 8: | dispersion-compensating element |
| 9: | resonator mirror, partially transmitting for the parametrically generated wave of average frequency $\omega_1$ |
| 10: | output ray |
| 11: | non-converting pump ray |
| 12: | output ray |
| 13: | resonating parametrically generated wave of average frequency $\omega_1$ |
| 14: | device for initiating pulse formation |
| 15: | aperture |
| 16: | medium giving rise to Kerr lens |
| 17: | device for hcanging the opticalpath length of the resonator |
| 18: | device for measuring the pump wave poer enhancement |
| 19: | regulation system |
| 20: | device for tuning the pump source frequency |
| 21: | resonating pump wave of average frequency $\omega_1$ |

I claim:

1. A short pulse optical parametric oscillator system comprising:

an external continuous-wave laser pump source;

a non-linear optical medium for parametric amplification;

a plurality of mirrors having high reflectivity for one of two parametrically generated waves and low reflectivity for another of said two parametrically generated waves; and a saturable absorber for a resonating wave to create mode-coupling, wherein said non-linear medium, said plurality of mirrors and said saturable absorber cooperate to form an optical resonator pumped by said external continuous-wave laser to generate short optical pulses.

2. A short pulse optical parametric oscillator system comprising;

a continuous-wave laser pump source;

a first non-linear optical medium for parametric amplification;

a second non-linear optical medium of third order;

a plurality of mirrors having high reflectivity for one of two parametrically generated waves and low reflectivity for another of said two parametrically generated waves; and an aperture, wherein said non-linear medium, said plurality of mirrors and said aperture cooperate to form an optical resonator pumped by said continuous-wave laser, said third order non-linear medium forming a Kerr lens via pulses circulating in said resonator, wherein said aperture is adjusted to a strength of said Kerr lens to create mode coupling.

3. The oscillator system of claim 1, wherein said resonator comprises means for adjusting a group velocity dispersion of pulses resonating in said resonator.

4. The oscillator system of claim 2, wherein said resonator comprises means for adjusting a group velocity dispersion of pulses resonating In said resonator.

5. The oscillator system of claim 1, wherein said non-linear medium has an inhomogeneity in a second order non-linear susceptibility along a propagation direction of a pump wave to increase a phase matching bandwidth of said non-linear medium with respect to that of a homogeneous medium.

6. The oscillator system of claim 1, wherein said continuous-wave laser pump source is single-frequency, said optical resonator having a high reflectivity at the frequency of said laser pump source, and further comprising means for changing an optical path length of said resonator to measure a power increase of a pump wave in said resonator and for controlling said path length such that said power increase is maximized.

7. The oscillator system of claim 1, wherein said continuous-wave laser pump source is single-frequency, said optical resonator having high reflectivity at the frequency of said laser pump source, and further comprising means for tuning said single-frequency as well as devices for measuring a power increase of a pump wave in said resonator and for controlling a pump source frequency to maximize said power increase.

8. The oscillator system of claim 1, wherein said continuous-wave laser pump source emits several longitudinal modes, said optical resonator having a high reflectivity at the frequencies of said laser pump source and further comprising devices for changing an optical path length of said resonator, for measuring a power increase of a pump wave in said resonator, and for controlling said path length to maximize said power increase.

9. The oscillator system of claim 1, wherein said saturable absorber is a saturable Bragg reflector.

10. The Oscillator system of claim 4, wherein said first non-linear medium is a periodically poled crystal with non-linear susceptibility of second order.

11. The oscillator system of claim 4, wherein said first non-linear medium is an aperiodlcally poled crystal with a susceptibility of second order.

12. The oscillator system of claim 3, wherein Said group velocity dispersion is adjusted via at least one dispersion-compensating resonator mirror.

13. The oscillator system of claim 1, further comprising means for initiating pulse formation in said resonator.

14. The oscillator system of claim 2, further comprising means for initiating pulse formation in said resonator.

15. The oscillator system of claim 1, wherein said parametric amplification in said resonator is effected by a susceptibility of third order of said non-linear medium.

16. The oscillator system of claim 1, wherein said parametric amplification in said resonator is effected by a susceptibility of second order of said non-linear medium.

17. The oscillator system of claim 2, wherein said first non-linear medium has a susceptibility of third order to effect said parametric amplification in said resonator.

18. The oscillator system of claim 2, wherein said first non-linear medium has a susceptibility of second order to effect said parametric amplification in said resonator.

19. The oscillator system of claim 13, wherein said non-linear medium is an optical fiber.

* * * * *